Sept. 14, 1937.  O. ZIMMERMANN  2,093,299
PHOTOGRAPHIC VIEW FINDER
Filed Dec. 7, 1935
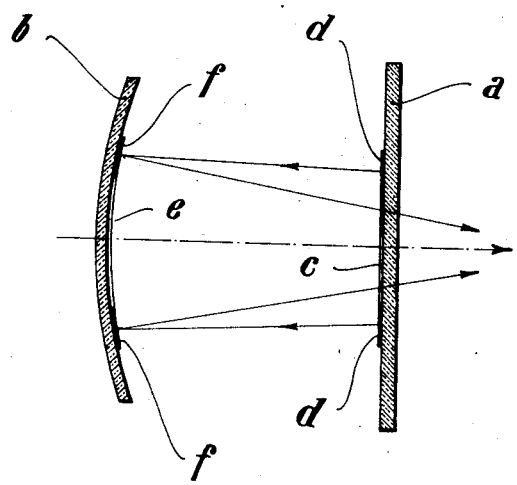
Otto Zimmermann
INVENTOR
BY
ATTORNEY Patented Sept. 14, 1937

2,093,299

UNITED STATES PATENT OFFICE 2,093,299

PHOTOGRAPHIC VIEW FINDER

Otto Zimmermann, Wetzlar, Germany

Application December 7, 1935, Serial No. 53,327
In Germany December 22, 1934

2 Claims. (Cl. 88—1.5)

This invention relates to photographic view finders of the type which have a mask for framing the field of view mounted in front of the eye opening. Heretofore it has been proposed to mount a negative optical element in front of the eye opening which element is provided with a semi-transparent silvered surface for partly reflecting the frame surrounding the eye opening and thus define the field of view to the observer. This construction is not only expensive because of the silvered surface but it is also a distinct disadvantage. The semi-transparent silvered surface dims the light very materially so that the object can be seen only faint or blurred particularly under poor light conditions.

The object of this invention is to provide an improved view finder embodying a construction in which a non-transparent or almost non-transparent silvered curved mirrored fame is employed to function as a reflecting element so arranged that the limits of the field of view are reflected in infinity and thus appear sharp and clear in the finder. The reflection of the eye opening appears clear and sharp in that it is substantially or entirely totally reflected in a mirrored frame surrounding the field of view opening and thus may be seen clearly and easily distinguished. Thus construction embodies the advantage that the reflecting surface by forming a frame for the field of view affords the observer an unobstructed view through the frame. The object is seen sharply framed from its surroundings and without any decrease or dimming of the light.

In the accompanying drawing illustrating the invention the view finder is shown comprising two members $a$ and $b$ spaced a distance apart. The member $a$ is a transparent glass body provided with a rectangular non-transparent frame $d$. The space enclosed by the frame forms an eye opening $c$ as this term is used and understood in photographic view finders. The other member $b$ is a concave wholly transparent glass body provided with a concave mirrored rectangular frame $f$ which surrounds and frames the field of view opening $e$. The centres of the two rectangular bodies or parts $d$ and $f$ are coincidental with the optical axis of the view finder and the proportions are such that only the frame $d$ is reflected in the mirror $f$. The frame $d$ is located in the focal plane of the mirror $f$.

The field of view opening $c$ which is not required for reflecting purposes is not mirrored, nor silvered, but wholly transparent. The path of the reflecting rays are indicated by arrowheaded lines. Also the optical axis is shown.

When the observer looks through the eye opening $c$ he will see the object to be photographed through the optically unobstructed field of view opening $e$ surrounded by the sharply reflected image of the frame $d$, the light from the latter being reflected in the mirror frame $f$. Hence the object in the field of view is seen easily and clearly within the reflected image of the frame $d$ without any diminution of the light surrounding or prevailing at the point where the object is located.

I claim:

1. A photographic view finder for observing the field of view optically unobstructed and without diminution of prevailing light comprising a transparent member, a rectangular frame on said member defining and surrounding the eye opening of said finder, a second wholly transparent concave member spaced a distance in front of the said first member, a concave rectangular mirrored frame on said second member, the mirrored frame facing the said first rectangular frame, the latter being located in the focal plane of the mirrored frame, the centres of the said two rectangular frame members being coincidental with the optical axis of the finder, the said two frame members being substantially of the same dimensions.

2. A photographic view finder for observing the field of view optically unobstructed and without diminution of prevailing light comprising a concave wholly transparent member, a concave rectangular non-transparent reflecting frame on said member enclosing and framing the field of view opening of the finder, a second transparent member spaced a distance from the said first member, a rectangular frame on said second member facing the said reflecting frame and located in the focal plane thereof, the said second rectangular frame enclosing and framing the eye opening of the finder, the said two openings and rectangular members being alined in the optical axis of the finder, the said reflecting frame reflecting the image of the said second rectangular frame in infinity.

OTTO ZIMMERMANN.